United States Patent
Williams

(10) Patent No.: US 11,579,834 B2
(45) Date of Patent: Feb. 14, 2023

(54) DIGITAL AUDIO WORKSTATION INTERFACE FOR STREAMING AUDIOVISUAL DATA

(71) Applicant: Elite Audio Records, Kingston, PA (US)

(72) Inventor: Ronald J. Williams, Winter Park, FL (US)

(73) Assignee: ELITE AUDIO RECORDS, Kingston, PA (US)

( * ) Notice: Subject to any disclaimer, the term of this patent is extended or adjusted under 35 U.S.C. 154(b) by 167 days.

(21) Appl. No.: 17/120,157

(22) Filed: Dec. 12, 2020

(65) Prior Publication Data

US 2022/0188061 A1    Jun. 16, 2022

(51) Int. Cl.
| | | |
|---|---|---|
| G06F 3/16 | (2006.01) | |
| H04L 65/80 | (2022.01) | |
| H04L 65/403 | (2022.01) | |
| H04L 65/75 | (2022.01) | |
| G06F 17/00 | (2019.01) | |

(52) U.S. Cl.
CPC .............. *G06F 3/16* (2013.01); *H04L 65/403* (2013.01); *H04L 65/762* (2022.05); *H04L 65/764* (2022.05); *H04L 65/80* (2013.01)

(58) Field of Classification Search
CPC ......... G06F 3/16; G06F 3/165; H04L 65/403; H04L 65/762; H04L 65/764; H04L 65/80
See application file for complete search history.

(56) References Cited

U.S. PATENT DOCUMENTS

| | | |
|---|---|---|
| 8,224,147 B2 | 7/2012 | Wilcox et al. |
| 9,386,123 B2 | 7/2016 | Pan |
| 9,432,134 B2 | 8/2016 | Radford et al. |
| 9,514,723 B2 | 12/2016 | Silfvast et al. |
| 9,705,953 B2 | 7/2017 | Moorer |
| 10,310,847 B2 | 6/2019 | Mathur et al. |
| 10,650,349 B2 | 5/2020 | Claman et al. |
| 2002/0026256 A1 | 2/2002 | Hilton |
| 2014/0280589 A1 | 9/2014 | Atkinson |
| 2014/0337420 A1 | 11/2014 | Wentzloff et al. |
| 2015/0032797 A1* | 1/2015 | Pan ...................... H04L 65/762 709/203 |

(Continued)

*Primary Examiner* — Quoc A Tran
(74) *Attorney, Agent, or Firm* — Nath, Goldberg & Meyer; Joshua B. Goldberg

(57) ABSTRACT

A portable device and accompanying software provides users with a digital audio workstation with integrated tools take in raw audio data from physical inputs and map the raw data to various virtual outputs. Raw audio data for recording (recording data) is cast in real-time to a remote server. Monitoring data is simultaneously sent to collaborating devices via P2P protocols. The bitrate of the data for P2P transmissions can be adjusted to allow remote multiple users recording simultaneously to hear monitoring data in synchronicity, regardless of the speed of their respective internet connections. Face-to-face collaboration may be facilitated through the streaming of video data as the monitoring data. The low-latency of the P2P monitoring transmissions frees up bandwidth for the real-time streaming of the recording data. Audio recordings are uploaded to a central server, where they may be available to authorized collaborators for editing.

18 Claims, 8 Drawing Sheets

(56) References Cited

U.S. PATENT DOCUMENTS

| | | | |
|---|---|---|---|
| 2015/0256613 A1* | 9/2015 | Walker | H04L 43/10 |
| | | | 709/217 |
| 2017/0104796 A1 | 4/2017 | Fahey | |
| 2018/0095713 A1* | 4/2018 | Rubin | G10L 19/008 |
| 2018/0190250 A1 | 7/2018 | Hiskey et al. | |
| 2019/0066643 A1 | 2/2019 | Packouz et al. | |
| 2019/0259360 A1 | 8/2019 | Yoelin | |
| 2020/0058279 A1 | 2/2020 | Garrison | |
| 2020/0227013 A1 | 7/2020 | Elson | |

* cited by examiner

| Audio Device Input List | Audio Device Output List |
|---|---|
| Sample Internal Audio Device<br>In: 2x 48kHz, 16Bits | Out: 2x 44.1 - 48kHz, 32Bits<br>Out: 2x 8 - 192kHz, 24Bits |
| A — Mic/Line In 1x 8 - 16kHz, 16 bits<br>A — Virtual In: 8x 44.1 - 192kHz, 24Bits | A — Virtual Out: 8x 44.1 - 192kHz, 24Bits<br>A — Main Out: 1x 8 - 16kHz, 16 bits |
| A — Sample Audio Interface Device<br>Mic/Inst/Line In: 8x 44.1 - 192kHz, 24Bits<br>A — Virtual In: 2x 44.1 - 192kHz, 24Bits | Line Out: 8x 44.1 - 192kHz, 24Bits<br>Main Out: 2x 44.1 - 192kHz, 24Bits |
| Sample Video Capture Device<br>In: 1x 8 - 16kHz, 16Bits | Out: 1x 8 - 16kHz 16Bits |

FIG. 2B

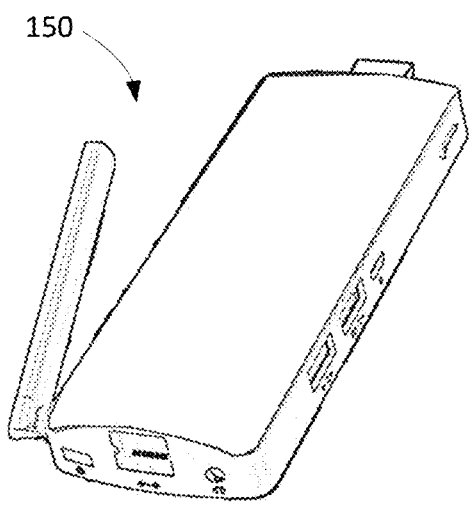

FIG. 2C

DIGITAL AUDIO WORKSTATION INTERFACE FOR STREAMING AUDIOVISUAL DATA

BACKGROUND

Digital Audio Workstations (DAWs) are well established as having taken the place of multi-track tape recorders or other analog systems used for recording, editing and producing audio files. As the number of available commercial devices and application software in this space increases, the recording industry has become increasingly democratized and less reliant on professional, physical recording spaces. However, the performance and accessibility of more recent practices of streaming audio recording still depends heavily on bandwidth and latency limitations. High-speed networking and media compression technologies have made it possible to provide real-time multimedia services over the Internet, allowing remotely located individuals or groups may record streaming audio collaboratively in real-time. However, real-time multimedia transmission experiences several constraints. Because audio/video data is played out continuously, if the data does not arrive in time, the play out process will pause. Accordingly, all of the users participating in the real-time recording, particularly those with slower Internet connections, may not transmit or receive data on a timely or consistent basis, leading to imperfections in recorded audiovisual data. Additionally, web-based content distribution architecture suffers from server overloading when a large number of user requests arrive. These latency and complexity issues may necessitate re-recordings and/or extensive post-processing to synchronize or remove noise in audiovisual data, all of which can be expensive tasks, both in computational and time resources. Further still, collaborative creation may be further complicated by the use of multiple DAWs or interfaces by different users within a single recording session.

Therefore, additional solutions for resolving latency issues in digital audio recording, while still retaining a DAWs' robust functionality and user-friendliness, are generally desired.

BRIEF DESCRIPTION OF THE DRAWINGS

The disclosed embodiments have other advantages and features that will be more readily apparent from the detailed description, the appended claims, and the accompanying figures (or drawings). The disclosure can be better understood with reference to the following drawings. The elements of the drawings are not necessarily to scale relative to each other, emphasis instead being placed upon clearly illustrating the principles of the disclosure.

FIG. 2B is a diagram illustrating input/output components of an audio device console in accordance with some embodiments of the present disclosure.

FIG. 2C is an exemplary hardware device incorporating an audio device console in accordance with some embodiments of the present disclosure.

Figure 1A:
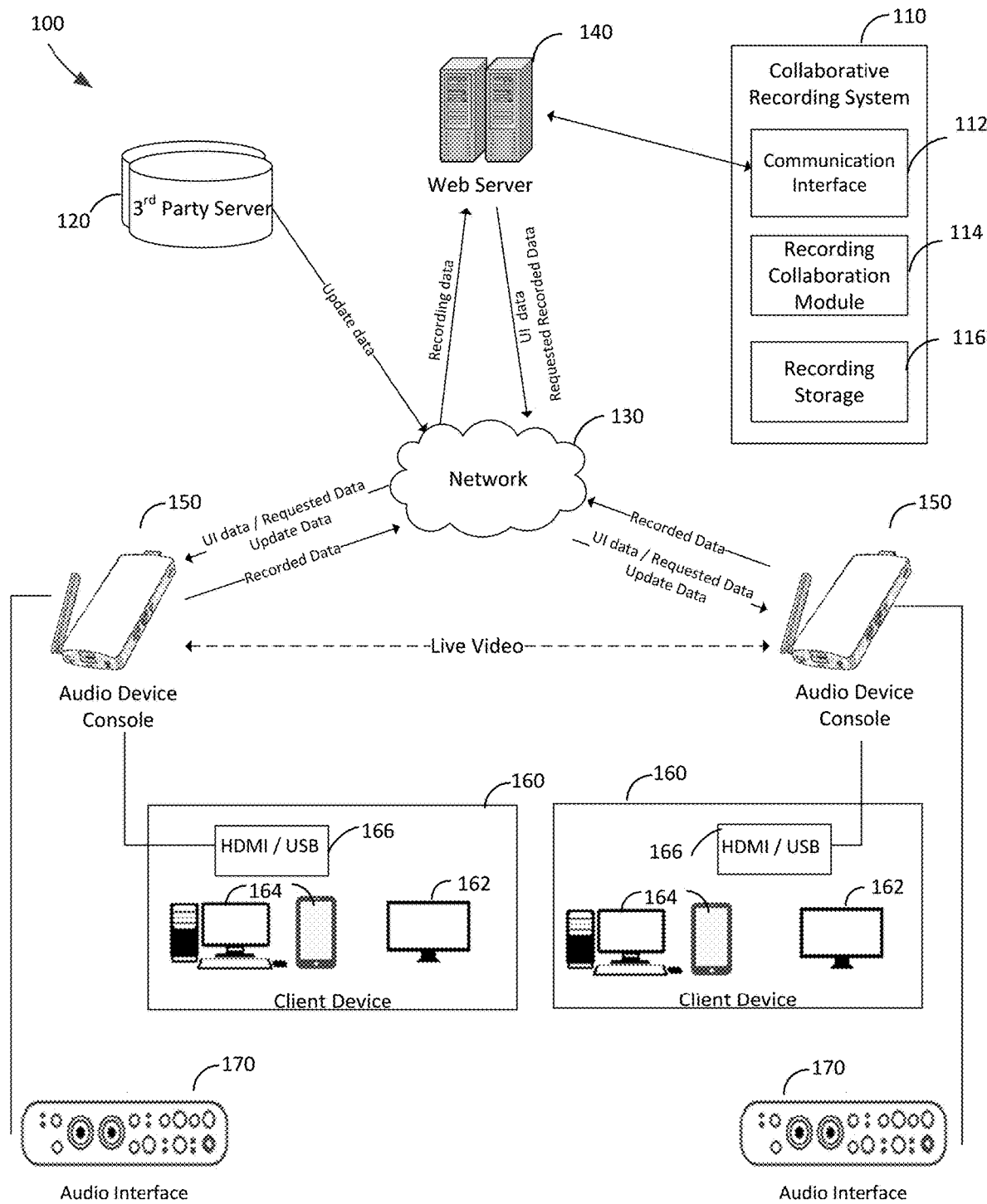
FIG. 1A depicts an environment including a system for collaborative use of digital audio workstation software in accordance with some embodiments of the present disclosure.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

The methods and systems described herein generally relate to software and hardware solutions for digital audio recording technologies, where a plurality of client devices connect to a single server to record, manage, or edit audiovisual data. In some embodiments, a plurality of client devices may be connected to a collaborative recording system located on one or more servers remote to the client devices. Multiple users, each with different local client devices, may work in real-time on a collaborative recording project, where recorded audio data (or audiovisual data) is cast from the client device to the collaborative recording system. The data cast from the client device is available, in real-time, to the other users with different client devices, each user being located in a different geographic location.

In some embodiments, an audio device console takes data from an audio input (e.g., an audio interface, an instrument, a microphone, etc.) through a physical cable, and creates a virtual output connection that outputs in real-time the raw audio data to a remote web server where such data is recorded and stored. By these means, in an exemplary embodiment, the audio device console functions as a patch bay between various inputs of a single collaborators and the server. Each of multiple collaborators may have a dedicated audio device console. In some embodiments, the audio device console is a dedicated device, such that the device does not run any background services or applications, thereby optimizing bandwidth for real-time audio transmission.

In some embodiments, the audio device console communicates directly with the audio device consoles of one or more other users, creating P2P connections with that allow for the for the real-time exchange of monitoring data (the same recorded data) that facilitates a collaborative process. An audio console transmits and receives data in data units (e.g., packets) travelling in a usual manner from a virtual output cable on the device to an open port of another audio device console. That is, the audio device console manages multiple different network communications—one to a central server (raw data) and one to each of last one other collaborators (monitoring data). The data sent over each of these signals is the same, that is, both are raw audio data. However, the data sent to collator devices is not recorded or captured. Rather, the raw data sent via P2P is simply used for monitoring, that is, allowing the users to hear the signal coming from each individual collaborators. Because P2P transmission is used rather than HTTP, the transmission speed is improved, allowing for sufficiently reliability of transmission of monitoring data without distortion. In alternate embodiments, the audio device console may use a webcam and/or an internal or external microphone, and the transmitted monitoring data may include additionally include audio data and/or video data from these devices for collaboration, in addition to the raw audio data from the audio interface (that is, the data also being sent to the central web server).

In some embodiments, the audio device console may allow a user to control what they hear and what they transmit. This may involve the setup of input/output interfaces, both physical and virtual, to direct audio data. Further, software controls may be used to optimize the real-time transmission over P2P by controlling the speed of transmission. In some embodiments, one or more latency conditions may exist in a connection between a first audio device console and a second audio device console. Transmissions to and from the audio console have a respective bitrate. To accommodate latency at a first remote user device, the monitored audio data being sent and received locally at the first audio device console (data collected from audio input interfaces such as a webcam) may be transmitted at a different rate than the raw full-resolution audio data (recorded data) being cast to the web server. The bit rate may be set by a managing collaborator (e.g., the user who started the session) to accommodate the bandwidth requirements of the collaborator with the least-reliable connection. Accordingly, even if their Internet connections are operating at different speeds, data can be uploaded and/or downloaded at the same functional rate from each of the audio device consoles used in the collaborative session.

In an exemplary embodiment, an audio device console prompts the user to download a portable digital audio workstation (DAW) to the audio device console, to be used with the audio device console's custom software. By these means, an audio device console is a device that is loaded and configured with digital recording studio software used to record, produce, and edit audio files. Users with different audio device consoles may collaborate while using any DAW they choose, even if different users chose different DAWs. A user may plug a pre-existing audio interface into the audio device console, as well as a visual display, such as a smart TV or monitor. In an exemplary embodiment, the portable DAW is connected via an HDMI port of such a device. When the audio console is plugged in, the user will have access to the DAW software of his or her choice for recording. In alternate embodiments, another type of device such as a PC, laptop, smartphone, or the like can be plugged into the audio device console. In alternate embodiments, rather than using a portable or dedicated audio console, the audio device console may be a computer (e.g., PC, tablet, laptop, smartphone etc.) configured with specialized DAW software.

In some embodiments, the user may, via a limited browser or application provided by the audio device console, either navigate to, or be automatically connected to, a website or interface provided by the web server. This website may provide one or more graphical user interfaces are displayed to the user for audio streaming and collaboration. More specifically, in some embodiments, an audio device console or other client device belonging to a user authorized to use a collaborative recording system (e.g., subscribers) can collaborate to in real-time with other remote users, to listen to and share raw audio data, collaborative data, and the like with other users. Audio recordings may be accessed and edited and/or combined (e.g., as layered audio), expanding on one recording project to create a combined audio track using recordings from multiple users.

Conventionally, musicians and collaborators transmit audiovisual files between over the Internet, often experiencing latency issues that make session-style collaboration difficult of impossible. Issues of latency are exacerbated by the speed of any one collaborator's internet connection, the bandwidth requirements at each client device, the number of people at and connected to the shared collaborative website, the distance of the collaborators, and other factors. Further still, as different users may use different software, audio production applications, editing, audio capture software, etc., inconsistencies in the format of data or the capabilities of different software may arise, adding to the time and cost of post-production activity. What is more, the repeated transmission of large files and the increased complexity of processing overhead may contribute to network latency.

In contrast to the conventional systems, the systems and methods described herein provide a dedicated device and dedicated server that allow users to transmit audio data in real-time. Recording data (sent to a server) and monitoring data (sent to other collaborators) is handled different, to maintain data quality and integrity or recorded raw data transmitted to a designated server while optimizing for usability of shared, temporary data. Unlike conventional solutions, each audio device console is able to "synchronize" its transmission of monitoring data (the delay of which would impact other collaborators) by adjusting its monitored audio bitrate, while the data uploaded to a shared server still maintains industry-standard bitrate.

The systems and methods described herein do not limit a user to any one type of audio interface or any one type of DAW software, lowering the barrier for entry and allowing for greater participation in any particular session. Further, the systems and methods described herein do not limit solutions to a single type, speed or configuration of network, and devices with any of single or multiple physical or logical interfaces can interface in collaborative real-time solutions.

FIG. 1A depicts, in accordance with some embodiments of the present disclosure, an environment 100 including a collaborative recording system 110 for facilitating the real-time creation of an audio and/or audiovisual recording by one or more users communicating with the system 110 over a network 130. Network 130 is, in the exemplary embodiment, any type of (or any combination of one or more of) wired network, such as Ethernet or fiber optics, wide area network (such as the Internet), local area network (such as an intranet), cellular network (e.g., Sprint, AT&T, or the like) or another type of wireless network, such as Wi-Fi, Bluetooth, Bluetooth Low Energy, and/or other close-range wireless communications. In various embodiments, network 130 may be any IP-enabled network, including microwave, radio, and the like. In still other embodiments, one or more of any of the above-listed network types may be used, or any combination thereof. In the exemplary embodiment, information may be communicated between system components in an encrypted format such by a transport layer security (TLS) or secure socket layer (SSL) protocol. In an exemplary embodiment, the components of the environment 100 may use the transmission control protocol/Internet protocol (TCP/IP) to facilitate communication.

As shown in FIG. 1A, a web server 140 is connected to collaborative recording system 110 and may be used to deliver content to or from the system 110. Web server 140 is communicably accessible to users who may wish to collaborate with each other and/or access or share recording data. For instance, web server 140 may receive content data from an audio device console 150 (described in greater detail below), store that content data at system 110, and make that content data available to one or more audio device consoles 150, which are also referred to herein in some embodiments as a portable DAW. The specifics of this device may be described herein with greater detail with reference to FIG. 3, however, in general, the audio device console 150 may be understood as a device with software capable of performing tasks on digital audio data, such as casting, recording, mixing, sequencing, or the like.

In some embodiments, the audio device console 150 may be a discrete storage drive or peripheral device, such as a solid state drive (SSD), that is plugged into at least one client device 160 through a port 166 that may be, e.g., an HDMI port, USB-C port, or other standard connector interface. In other embodiments, the audio device console 150 may be otherwise connected to the client device 160 via any wired or wireless communication protocol such as Bluetooth or BLE. Each client device, referred to herein individually or collectively as client device(s) 160, is operated by a user who wishes to access and build upon the stored data. A client device 160 may be used by an individual or entity to access, view, download, record, edit, and/or otherwise take action in relation to content transmitted from or delivered to the user to/from the web server 140. When the console 150 is plugged into the client device 160, the user can interact with the DAW software provided through the console 150. In an exemplary embodiment, client device 160 is a TV, computer monitor, projector/screen, or other relatively simple device that has a visual (or other) display to present digital data to the user, however in other embodiments, client device 160 may be another computing device, such as a smartphone or other handheld device such as a tablet or reader, desktop computer, laptop computer, touchscreen device, or any other appropriate device capable of presenting information to a user via an electronic display.

In an exemplary embodiment, a user plugs in (or otherwise connects, e.g., wirelessly) audio interface 170 and client device 160 into the console 150. One or more input devices may also be plugged into audio device console 150, such as a mouse, keyboard, stylus, touchscreen, remote, joystick, controller, or any other appropriate input device, for example through a USB or Bluetooth connection. In other embodiments, the input device may be part of or attachable to the client device 160 (e.g., where the client device is a television and the input device is the television remote, or where the input device is the touchscreen of a monitor).

While FIG. 1A illustrates only two audio device consoles 150, two audio interfaces 170, two client devices 160, one web server 140, one system 110, and one third party server 120, it may be understood that any number or type of users, servers, devices, and/or databases may be variously used in different embodiments in any appropriate configuration.

Figure 1B:
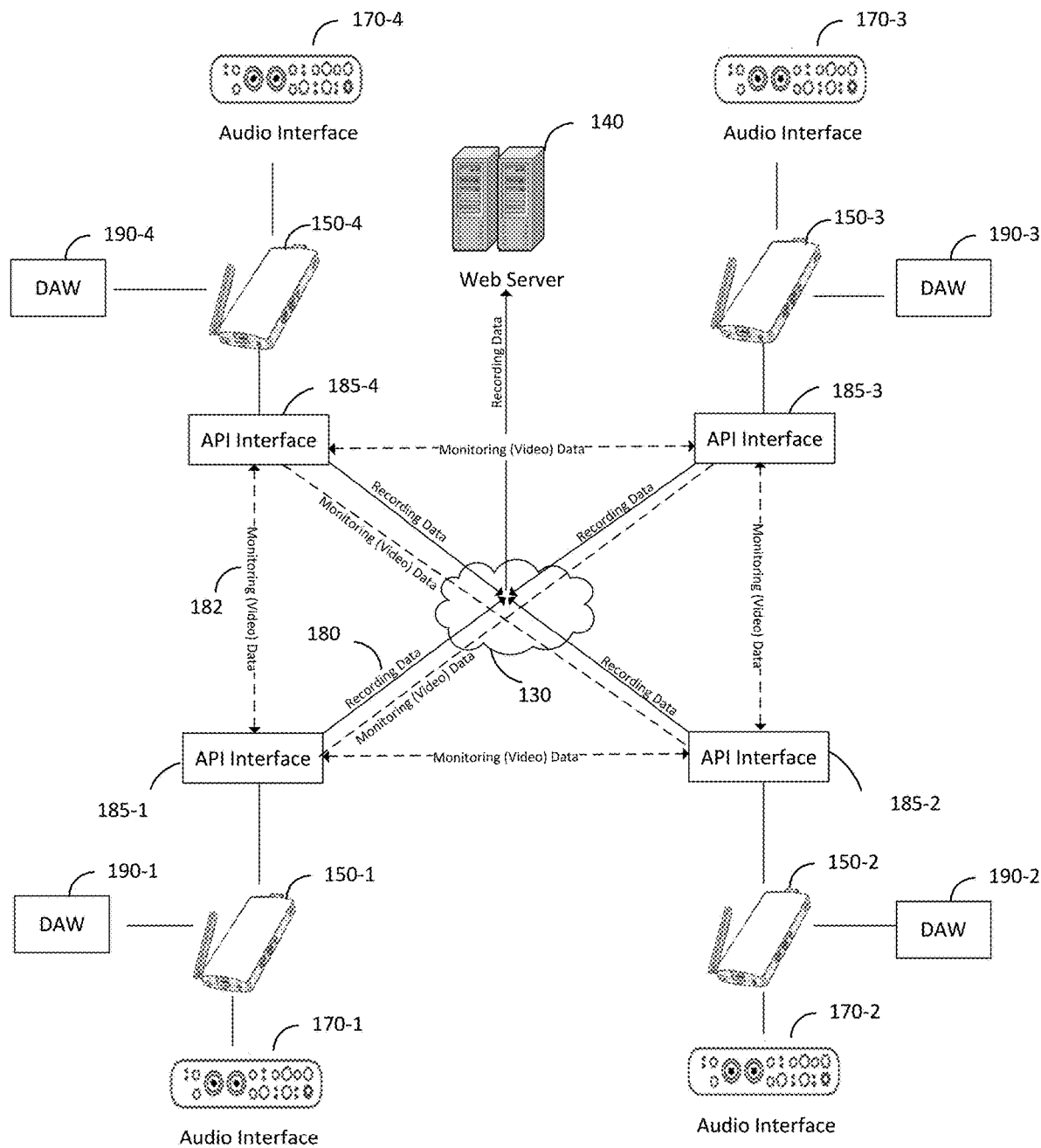
FIG. 1B depicts an environment including a system for collaborative use of digital audio workstation software in accordance with some embodiments of the present disclosure.

FIG. 1B depicts another view of certain components of environment 100. Here, device audio device console 150 is a portable DAW interface. Console 150 functions as a stand-alone interface that allows users to plug-and-play into any television or computer monitor (device 160). The console 150 connects to the web server 140 via an API 185, and in turn, to the system 110, in order to record and collaborate (using device 160). Information from web server 140 is delivered to the user and requests from the user are delivered to the web server via DAW software 190 installed on the console 150. Any of a variety of compatible DAWs 190 and commercially available audio interfaces 170 may be used with the console 150.

Each audio device console 150 takes input of audio data (digital data) from a standard audio interface 170. Audio interface 170 may be any appropriate hardware or software device that acts as the front end to the recording system of audio device console 150, taking in electronic signals representing a sound input, processing those signals, and outputting the signals as digital audio data. An audio interface may be configured in any known way (and by any known manufacturer), but may generally understood to have one or more ports for connectors to plug in microphones, instruments, amps, etc. (for recording) as well as speakers and headphones (for listening). In addition, audio interface 170 may have one or more interfaces to connect to audio device console 150 via a USB or Thunderbolt port, PCI, PCIe, or Ethernet port, or any other appropriate interface capable of facilitating transmission/receipt of audio data. In some embodiments, audio interface 170 may have software loaded thereupon for audio-to-digital conversion, metering, boosting, and/or other audio processing functions. In some embodiments, audio interface 170 may provide power to one or more devices (e.g., a microphone).

Audio device console 150 takes as input raw audio data from audio interface 170 and casts that raw audio data (recording data 180) to the web server 140 in real-time. In an exemplary embodiment, no processing of the raw audio data happens on console 150, however in other embodiments, some minimal amount of processing (e.g., noise cleanup or balancing) may be performed locally on the console 150, so long as such activity does not introduce significant or noticeable delay into the data transfer to the server 140.

In an exemplary embodiment, a user uses the audio device console 150 to connect to a web server 140, which sends to the audio device a UI allowing the user to initiate or join a recording session. If the user is an initiator of the session, they may be prompted to add collaborators, publish their session information (e.g., making it public), invite other collaborators, or conduct a solo recording session. For example, the initiating collaborator could set/control limits of the session, setting limits on size, individually or collectively allowing or denying users to attempt to join, identifying in advance the IDs of users who may join the session, or the like. When a collaborator joins an existing session, each of the users' audio device consoles 150 will begin a process of connecting to the collaborator's console. The respective connections between users do not go through the central web server 140 but rather are ad hoc peer-to-peer connections between two discrete, remotely located consoles. In an exemplary embodiment, the IP addresses and/or port information of the various user devices to be connected to the session are provided to each of the respective consoles 150 by the web server 140 at the time the session is started and/or at each time a new user joins. In some embodiments, the port number for P2P communication may be common to all consoles 150s or may be based on industry standard.

At the end of the joining process, an independent P2P connection has been established for each respective pair of consoles 150 that have joined the session, with the group of collaborators functioning together in a P2P network. Four collaborators with respective consoles 150-1 through 150-4, audio interfaces 170-1 through 170-4, and DAWs 190-1 through 190-4 are shown in FIG. 1B as participating in a collaborative session, though any non-zero number of participants can be present in other embodiments (one or more consoles 150). During the session, file transfer of packetized digital data (monitoring data) is performed as appropriate for the particular network configuration. In this manner, data (monitoring data) can be distributed quickly and efficiently through the network during the recording session without passing through web server 140 or any other central server computer. When the recording session is complete, and the session ended by one or more users, each of the P2P connections are closed, however, each console 150's respective connection to web server 140 is maintained as long as the console 150 is powered on (or alternately, in active use).

During a collaborative recording session, each independent audio device console 150-1 through 150-4 simultaneously transmits and receives raw audio data to/from to all collaborating devices as monitoring data 182 over each of its respective P2P connections. The transmission of monitoring data is performed in addition to each console's transmission 180 of recording data to the web server 140. For instance, in the example of FIG. 1B, the web server 140 receives four real-time transmissions 180 of streamed recording data, and each console 150 receives three real-time (or near real-time) transmissions 182 of streamed monitoring data, one from each of the other consoles 150.

In some embodiments, audio device consoles 150 (and/or client devices 160) may additionally have a webcam or other built in or peripheral recording device that can capture image and/or video data to facilitate face-to-face communication (e.g., through live streaming video), and this captured data may be included along with the monitoring data 182 transmitted directly between consoles 150. Because the transmitted monitoring data 182 is not being sent through HTTP, it is not subject to many of the problems recurrent in client-server transmission, and therefore, bandwidth issues that might arise with real-time data transmission are significantly reduced or eliminated. More particularly, client-server architectures are subject to a variety of problems, including high load against the central server, the potential for excessive consumption by a single powerful client, balancing and distribution of load from different clients, as well as general congestion over the network. In the peer-to-peer solution of FIG. 1B and similar embodiments, when transferring monitoring data, each console 150 functions as a networked node that can both receive and provide data, so there is greater speed of distribution (greater occurrences of packet propagation), greater redundancy, and fewer points of failure, leading to a higher speed and reliability of transmission.

While audio device consoles 150, API interfaces 185, and audio interfaces 170 are shown as separate component parts in FIGS. 1A and 1B, in alternate embodiments, these components may not be discrete hardware components, and instead, any combination or subset of these components may be implemented together in a single network device, with different logical components.

Client-Side Components

Figure 2A:
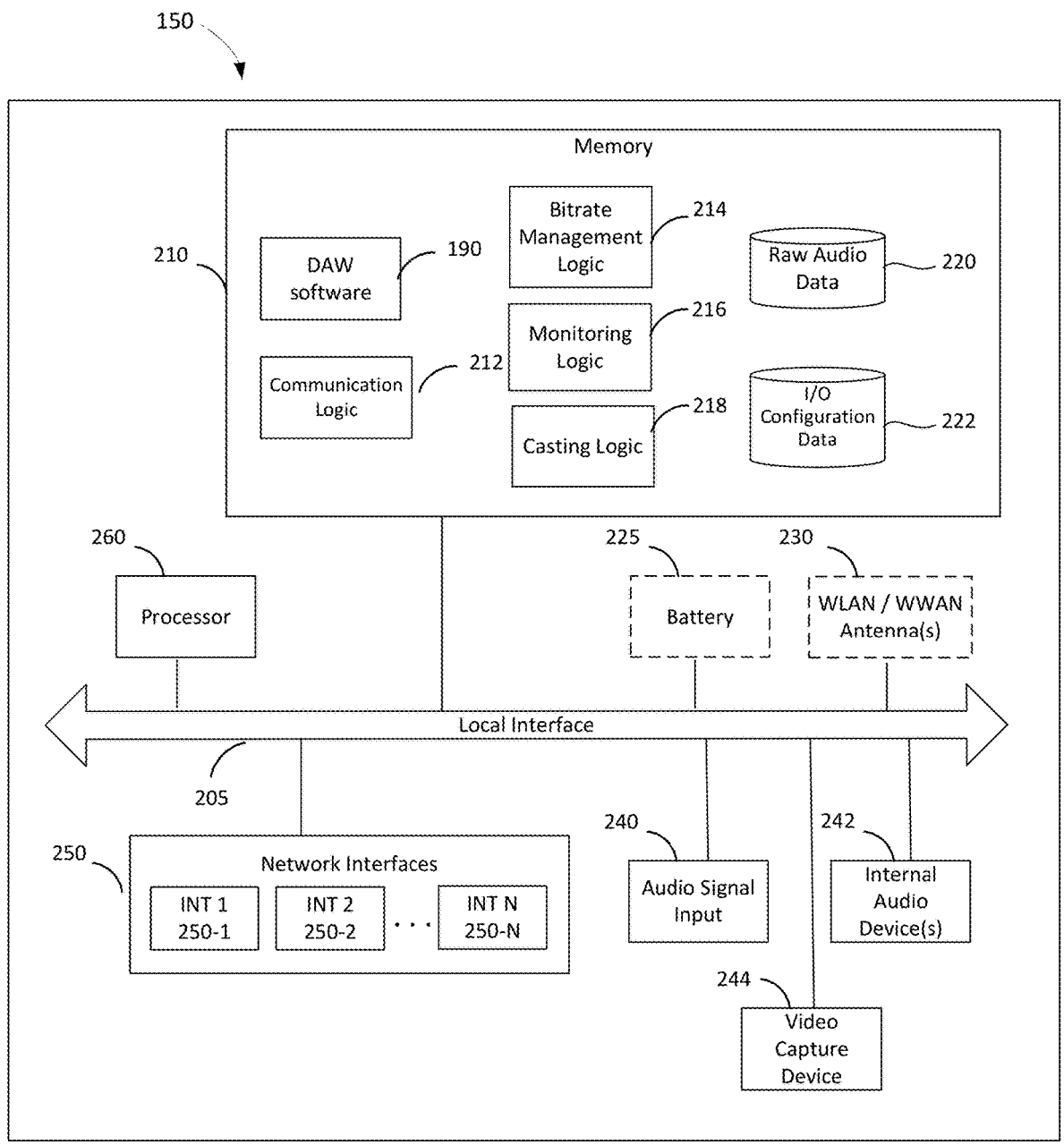
FIG. 2A depicts a block diagram of certain component parts of an audio device console in accordance with some embodiments of the present disclosure.

FIG. 2A illustrates exemplary components of an audio device console 150 in accordance with some embodiments. In particular, FIG. 2 illustrates an embodiment in which audio device console 150 is presented as part of a hardware device, though other embodiments are not so limited. In an exemplary embodiment, audio device console 150 is a device pre-loaded (or configured to be loaded) with digital audio workstation (DAW) software used to record, produce, and edit audio files. In some embodiments, this is a dedicated device, however, in other embodiments, the functions described herein may be performed on one or more other systems, such as a laptop, PC, smartphone, or other computing device (in some embodiments, device 160). The device may be portable (e.g., an SSD drive or similar) or fixed/coupled to a larger system.

While FIG. 2A illustrates a certain configuration of components, it can be understood that any practical configuration may be used, and the components need not fall into the particular logical groupings illustrated in FIG. 2A. Further, it will be generally understood that the architectures described below and illustrated in the figures are not limited to the components discussed herein, and may include other hardware and software components. Rather, for ease of illustration, only the components and functionalities most relevant to the subject systems and methods are discussed herein.

Audio device console 150 operates by connecting, at one end, to a pre-existing audio interface 170, and at the other end, to any television or computer monitor or other device 160 with an electronic display. When audio device console 150 is plugged in to a device 160, the console 150 boots up and facilitates connection to a website (served by web server 140) for, but not limited to, any of audio streaming, sharing, and collaborative recording and editing. In some embodiments, audio device console 150 may be controlled via a series of user interfaces delivered to the display of device 160 that can be interacted with via an input device (e.g., a mouse or touchscreen), whether built in to device 160 or console 150 or peripheral. These may include graphical user interfaces (GUIs) facilitating an initial activation and/or subsequent configuration and/or management, as well as navigation and data transmission to/from the website.

Upon an initial boot, the user may be asked to select which of a variety of DAW software 190 they wish to use with the console 150. For instance, a user interface may be provided to the user with hyperlinks or other means of selection to download and/or install industry standard and/or popular DAWs. Other embodiments may be pre-configured with particular DAW software, or may be configured to recognize a user's device or account (e.g., based on a login/password), so as to automatically trigger the download and installation of a desired DAW software. Such DAW software 190 might include, for instance, any of Pro Tool, Studio One, FL Studio, or any other appropriate software. After this selection, the latest version of such software and any supporting drivers, etc., will be accessed (e.g., from third party server(s) 120) and installed on the console 150. In an exemplary embodiment, audio device console 150 will be updated automatically with the necessary drivers to guarantee compatibility with each downloaded DAW (for example in the background or when the console is not being actively used) or will prompt for the download/installation of such drivers. Upon a subsequent boot up, rather than prompting for the selection and/or installation of software, the console 150 will function to automatically query third party server(s) 120 to see if any updates to the DAW software and/or any updates to the operating system of the console 150 are available and/or recommended.

In an exemplary embodiment, the DAW software is developed by a third party rather than being customized to the audio device console 150 itself. That is, the circuitry of audio device console 150 and the computer software implemented thereon act as a medium via which a user can collaborate with other remote collaborators, even where a remote collaborator uses different DAW software to that installed on the user's audio device console 150. Accordingly, audio device console 150 may be generally thought of as providing a unifying or translation service between DAWs, though it is not limited thereto.

In one exemplary embodiment, a custom Windows operating system is installed on the console 150; however, other embodiments may differ such that any operating system (such as Linux or Mac OS) capable of supporting the DAW software and the other custom functionalities of the device may be used. The user of the console 150 does not access a typical Windows UI, but rather, is presented with a custom skin that limits the user to desired functionalities and/or applications. For instance, the user is limited to using the console 150 for the sole purposes of transmitting recorded data to the server 140 or obtaining, from the server 140, UI data and/or requested previously-recorded content. Because of this, the console 150 cannot, in routine use, be used to access the Internet aside from the content provided by the web server 140 to the DAW.

Through these means, the versioning, security, and integrity of the console 150's operating environment is maintained, prior to any connection of the console 150 to the web server 140. Further, as no extraneous bandwidth consuming processes are performed on the console 150, the entirety of the user's available bandwidth may be dedicated to the transmission of audio data during a recording process.

With reference to FIG. 2A, audio device console 150 may include a local communication interface 205 such as one or more buses, a processing unit 260, a memory 210 storing DAW software 190 (and any relevant plug-ins), and one or more network interface(s) 250. Processor 260 may execute instructions stored in a corresponding memory 210 to control the console's functionalities. Processor(s) 260 may be respectively implemented by any type of suitable processor and may include hardware, software, memory, and circuitry (or any combination thereof), for example, one or more of central processing units (CPU), digital signal processors (DSP), graphics processing units (GPU), application-specific integrated circuits (ASICs), field-programmable gate arrays (FPGAs), and/or microprocessors programmed with software or firmware, or other types of circuits for performing the described functionalities (described further herein), or any combination thereof. As one illustrative example, audio device console 150 might be made up of one or more single-board computers (SBC). In some embodiments, audio device console 150 may additionally have a cellular-capable dongle or an attached purposeful cellular appliance.

As used herein, memory 210 may refer to any suitable storage medium such as disks, thumb drives, etc., both volatile and non-volatile. Examples of such media include e.g., RAM, ROM, EPROM, EEPROM, SRAM, flash memory, disks or optical storage, magnetic storage, or any other tangible or non-transitory medium that stores information that is accessible by a processor. Different embodiments may have different capabilities, so long as the amount of RAM is sufficient to support receiving and processing data, and running all supporting software, as described herein. In an exemplary embodiment, a flash memory may be used.

As illustrated, a number of logics are stored in memory 210 that may facilitate multiple users from multiple locations to record simultaneously. These depicted components may variously represent one or more algorithms, computational models, decision making rules or instructions, or the like implemented as software code or computer-executable instructions (i.e., routines, programs, objects, components, data structures, etc.) that, when executed by one or more processors 260, program the processor(s) to perform the particular functions of their respective logic. Although depicted in FIG. 2 as several discrete components, each labelled as an individual "logic", in various embodiments, the functions of each respective components 212, 214, 216, and 218 may be executable on their own or as part of one or more other logics; that is, any configuration of the depicted logical components may be used, whether implemented by hardware, software, firmware, or any combination thereof. Further, the logics need not necessarily be part of audio device console 150 and may instead by distributed over one or more computing systems, such as within client device 160 and/or audio interface 170. The capabilities of these various components are described in greater detail below.

In an embodiment where audio device console 150 is a stand-alone appliance that connects to a client device 160 via a wireless protocol such as Bluetooth, audio device console 150 may also contain a battery 225 and one or more antennas 230. As an alternate to a battery, one or more power supplies such as a physical connection to AC power or DC power (including power conversion circuitry), Power over Ethernet, or the like may be used. Battery 225 may be charged via a physical power connection, via inductive charging, or via any other suitable method. The battery may supply a variety of voltages to the components of audio device console 150 in accordance with the requirements of those components. Inputs from any of WLAN antenna(s) and/or WWAN antenna(s) 230 are received and processed by the processer 260.

Audio device console 150 also includes one or more of a variety of physical network interfaces 250-1 to 250-N (collectively, 250), such as optical, copper, Wi-Fi, Ethernet, or the like. Network interfaces 250 interface to any of one or more external devices that may offer an audio signal output, for example any of device 160 (e.g., an internal Windows Media Audio device), an audio interface 170, a webcam and/or other supported plug and play devices outfitted with audio drivers, and/or a master stereo output (e.g., for real-time low latency monitoring). In an exemplary embodiment, audio device console 150 contains one physical interface to client device 160, which may be either of a HDMI or USB-C Thunderbolt port, and one physical interface to an audio interface 170, however other embodiments may contain any number of physical interfaces. Interfaces 250 may also include one or more virtual network interfaces. Any number of interfaces, and/or any configuration thereof, may be possible in different embodiments. Data received/transmitted via any of the interfaces 250 is processed by the processor 260.

Audio device console 150 includes an audio signal input 240 that takes in a digital audio signal, such as a microphone or other line in. Audio signal input 240, which may include any physical or virtual interface, may connect to audio interface 170 and/or any of a variety of midi instruments (not specifically shown) external to the audio device console 150. While only one audio signal input 240 is shown in FIG. 2A, other embodiments are not so limited. The data collected from audio signal input 240 is the raw audio data that the user intends to record. This raw data is referred to herein as "recording data," typically a musical or audio track or other audiovisual data, to be uploaded to system 110 via web server 140. The raw data also makes up part of what is referred to herein as "monitoring data," the data that is sent to any collaborating consoles 150 to allow for collaboration between different within the recording session. The monitoring data is ephemeral; it is not transferred to server 140 or stored at the system 110, and is typically not stored at the client side (unless intentionally captured by the user of the console through another mechanism).

In addition, audio device console 150 may include one or more internal audio devices 242 (e.g., microphones), configured to capture analog (electric) signals and convert such signals into digital audio data. In some embodiments, console 150 may also take in video input, though one or more video capture devices 244, which may include a webcam, still or video image camera, or any appropriate image capturing apparatus and/or sensor. The data collected from devices 242 and 244 may generally be understood as additional monitoring data, such as conversation or video or audio recording made during collaborative efforts, to be sent to any collaborating devices as a stream of data in addition to the data input at audio signal input 240.

As just one example, the console 150 is a portable SSD device with 500 GB of storage space, onto which a Windows operating system, DAW software 190, and each of logics 212, 214, 216, and 218 is installed. Console 150 has one or more of the following ports: HDMI, Thunderbolt, CAT5/5e (or other Ethernet cabling), USB, and an audio port for connection to one or more of a TV or monitor 160, audio interface 170, any input devices (e.g., keyboard, mouse, or microphone) or output devices (e.g., speakers or headphone), and wall/phone ports or for any other type of wired data transmission. One example of such a device is shown in FIG. 2C, though of course other embodiments may differ.

With reference to FIG. 2A, memory 210 may store I/O configuration data 222, specifying a series of input and output interfaces for the transmission of digital data. With respect to recording data from the audio signal input 240, information is transmitted in real-time to the web server 140. The transmission recording data to the remote system 110 is performed by casting logic 218, in cooperation with one or more of network interfaces 250. In some embodiments, the recording data may be stored in memory 210 as raw audio data 220. That same recording data may still further be transmitted as part of the monitoring data to other collaborators via a P2P connection, along with other monitoring data, such as webcam data or audio data from another audio source. The data received from other collaborators is sent to the user's own headphones or speakers (or other desired output interface); accordingly, the user can hear the collective monitoring data of all the collaborators in time with what they are recording. Some alternate embodiments may also send the raw recording data directly to the user's headphones or speakers, though in most implementations, latency issues could lead to misalignment between such data and the monitoring data heard from other users.

As described above, audio and other data is taken in through a plurality of interfaces, and output to a plurality of virtual interfaces, such that the destination of data collected from different sources can be set by the user with great specificity. FIG. 2B illustrates an exemplary embodiment of an assignment of inputs and outputs from the audio devices. In an exemplary embodiment, this assignment may be displayed and/or set in the I/O settings of the DAW software (accessible via graphical user interface displayed on client device 160) for routing collected audiovisual data to particular selected sources. In the illustrated embodiment, items marked with the label "A" represent the active channels to be routed in the DAW's I/O settings, that is, the specified audio devices and/or connected devices and the specified output(s). The I/O settings cause the console 150 to function as a patch bay from input to outputs, whether server or other destination. For instance, audio/video data from a webcam (e.g., sample video capture device in FIG. 2B) can be routed to one or several virtual interfaces mapped to established P2P connections, and not to a server.

Recording data (e.g., kick, snare, hi-hat, and so on) may alternately (or additionally) have a different output, and can be routed to one or several virtual interfaces and ultimately to both the server. Recording data may also be output, e.g., back to a "main out" for the audio interface or console to which speakers or headphones may be connected. By these means, console 150 takes physical inputs from various audio devices and divides and routes those inputs to virtual cables. Therefore, the console 150 effectively functions as if the user were physically plugging in their instrument to the web server 140.

Figure 5A:
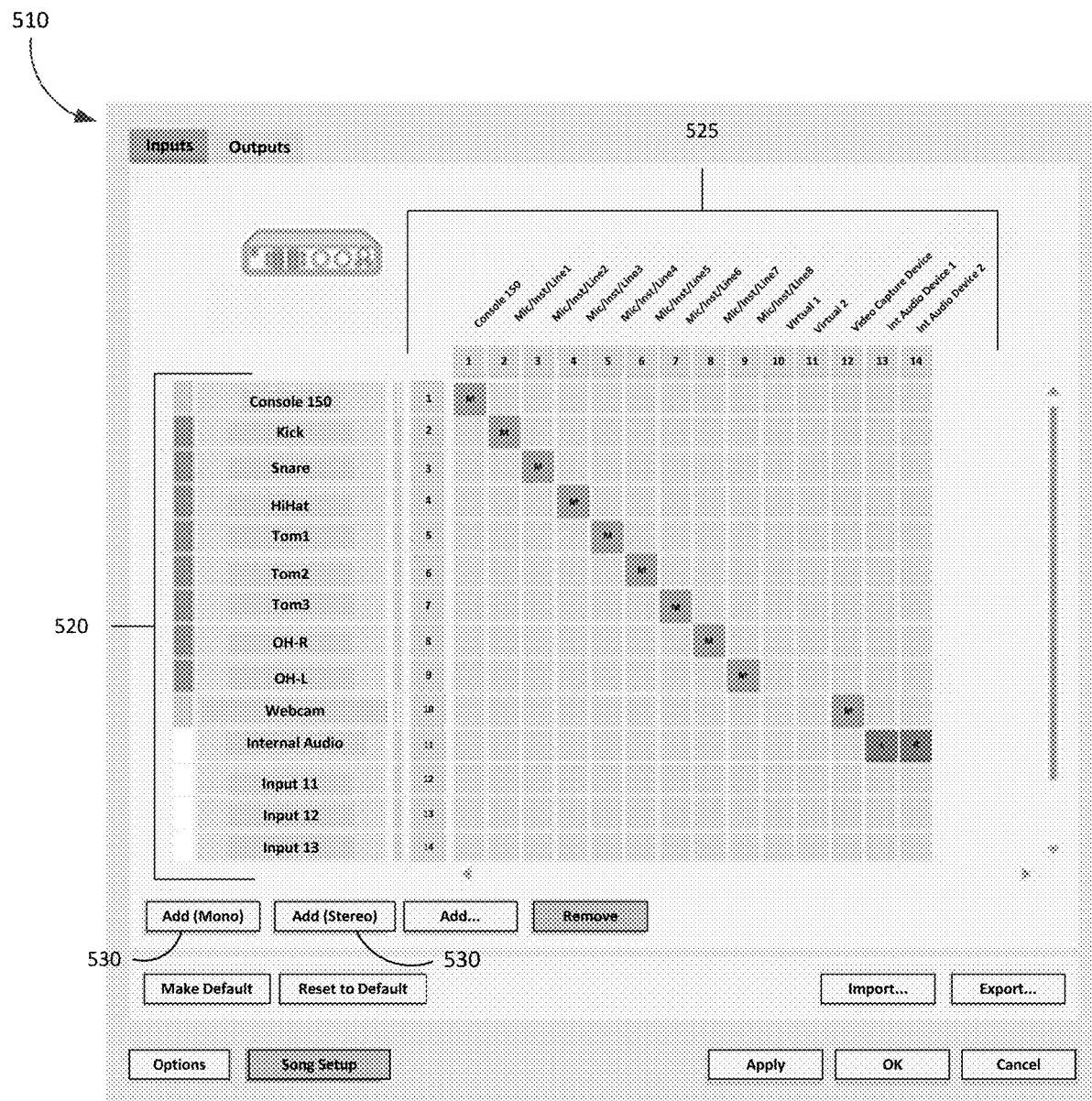
FIGS. 5A and 5B depicts diagrams illustrating input/output components of an audio device console in accordance with some embodiments of the present disclosure.
Figure 5B:
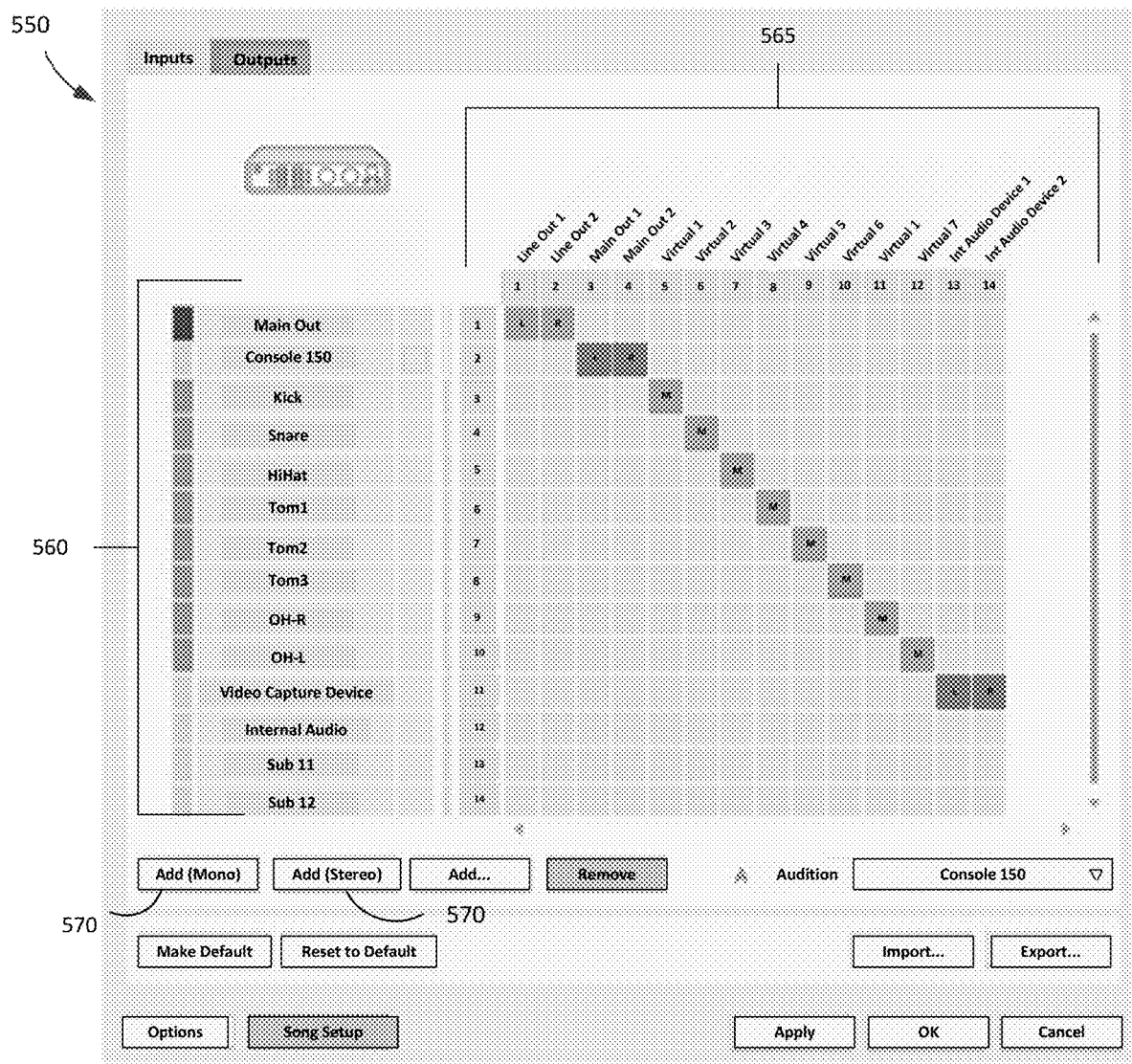

FIGS. 5A and 5B illustrate exemplary user interfaces through which the I/O settings may be modified, though of course other embodiments may differ in appearance or functionality, in the number, variety, or type of I/O devices, or in any of the particular user interfaces and/or fields presented. Turning first to FIG. 5A (input settings interface 510), a number of input sources are shown in left hand column 520, each being mapped to a corresponding interface in the columns 525. The audio device console 150 may be selected as a primary audio device in the DAW software, and each audio input (audio signal input(s) 240, internal audio device(s) 242, video capture device(s) 244, and any other peripheral devices connected via interfaces 250) are mapped to a desired output interface, routing data from an input point to an output point. This routing may be done according to user or device preferences, hardware limitations, industry standards, and the like.

Turning next to FIG. 5B (output settings interface 550), a number of tracks are illustrated in the left hand column 560. Each of these tracks are then assigned to a virtual output interface by selecting the desired output device listed in the columns 565. Each of the virtual output interfaces 565 correspond to a discrete data transmission that is sent out of the console 150. As illustrated, the Mic/Inst/Line Inputs are each assigned to virtual outputs where they will be routed through the API 185 to the web server 140 and system 110. By these means, the physical inputs plugged into the console 150 (the left rows of FIG. 5A, such as kick, snare, hi-hat and so on) are translated to virtual outputs (the columns of FIG. 5B), and may be transmitted to the remote server.

Further, each channel or channels may be assigned either a mono or stereo virtual output or a stereo output (fields 530, 570). In an embodiment with a multi-channel interface, multiple channels may simultaneously by assigning them each their own virtual outputs. In the event more than one user attempts to assign the same output, the user may be prompted to assign a different output.

In order for different users in different locations to record collaboratively, they should all hear the same monitoring data at the same time. Therefore, with regard to monitoring data, an optimization of user synchronicity is more urgent that an optimization of data transfer speed. Put another way, while the console 150 may prioritize speed of data transmission when sending recording data to the server 140, it instead prioritizes first, synchronization of transmission and receipt and second, speed of transmission when sending monitoring data. To accomplish this, the console 150, in cooperation with the consoles 150 of all the collaborators, modify the sample rate of transmission in the P2P connections to meet the speed of the slowest (or otherwise default) collaborator connection.

Bitrate management logic 214 allows a user to set a specific bitrate for the transmission of monitoring data to each collaborator console via P2P. In some embodiments, other desired or preferred connection settings (e.g., video or audio sample rate, resolution, or other measures of quality) may be set as well. The consoles therefore all transmit and receive monitoring data to each other at the same bit rate.

This may be understood as a low-latency monitoring, where the users may record and collaborate at different speeds. By adjusting software settings to change bit rate of the audio-visual data being monitored, slower or faster Internet connections can be accommodated. Higher bitrate with a higher sampling rate (viz., higher audio quality) requires higher bandwidth, while the converse, while taken up less bandwidth, results in a drop in audio quality. As one example, while a default transmission sample rate would be 48 Hz, a user with a slower connection may instead need to record at 44.1 Hz to accommodate bandwidth restrictions, and the other consoles would prompt their respective users (via the GUI) to match their settings for the session to the lower rate before they could begin their participation in the recording session.

The bitrate of the monitoring data being transmitted by P2P may differ from the rate of the actual audio being recorded and transmitted to the server. But while it might be the case that low-latency (and potentially lower audio quality) monitoring data is being shared, this minimization of latency in sending the monitoring data allows for reservation of bandwidth for the real-time transmission of the full-resolution recording data to the server 140, where the recording data is processed, recorded, uploaded to system 110, and made available for later access by users and collaborators. This difference allows for some amount of latency in the monitored data while still uploading and recording the other input audio data immediately to the remote server. Accordingly, the users all hear the same thing from their speakers or headphones, even if what is being heard is of a lower bandwidth than what is actually being recorded. In practicality, the latency experienced over the P2P monitoring connection will typically be very small (e.g., 500 ms or less) and minimally unnoticeable to the human ear. It will also be generally understood that sample rate of a recording can be altered in post-recording processing via the DAW software if needed.

In some embodiments, the setting of the bit rate for monitoring may be a custom, static setting by the user (e.g., an input by entered number, field, slider, or other selection). For example, in some embodiments the initiating user may sent to the other collaborators the rate at which the user's monitoring data will be recorded, specified either by user choice or automated action, to accommodate the user's internet speed. Other collaborators will be prompted by their respective consoles 150 to match the initiator's setting, by making a manual settings change, or confirming a settings change that is then automatically taken by the DAW. In other embodiments, rather than a static setting, the bitrate may be dynamically optimized and set by the initiating user's console 150 itself based on one or more stream statistics measured by monitoring logic 214. Further still, the bitrate may be determined based on one or more rules, based on a measurement obtained by monitoring logic 216, such as a number of dropped of lost packets, a latency measurement (in ms), or the like. In other embodiments, a user may, for example, set different preferred connection rates for different times of the day (e.g., morning/evening), different devices (e.g., wired/wireless), different groups of collaborators, or the like. In some implementations, the user may save these settings preferences as different options or modes that can be quickly selected when initiating a recording session.

The monitoring data, from audio signal input 240, internal audio device(s) 242 and/or video capture device(s) 244, is processed by monitoring logic 216. In some embodiments, monitoring logic 216 may apply one or more measurements to determine the bitrate of the monitored audio stream or other related values indicating network health or efficacy.

In another embodiment, rather than a hardware device, the functions of audio device console 150 may be implemented across one or more virtual servers in a shared cloud environment. That is, the functionality of the audio device console 150 may be distributed in whole or in part across one or more remote servers (or components thereof) or other computing resources, that is, in the cloud, whether dedicated or shared. In some embodiments, the specific algorithms or instructions configured to perform the functions of the audio device console 150 described herein are not executed locally to the console 150, but rather, may be provided to the client device 160 for execution through the use of one or more software development kits, which may include, e.g., one or more application programming interfaces (APIs), web APIs, tools to communicate with embedded systems, or any other appropriate implementation.

Server-Side Components

Figure 3:
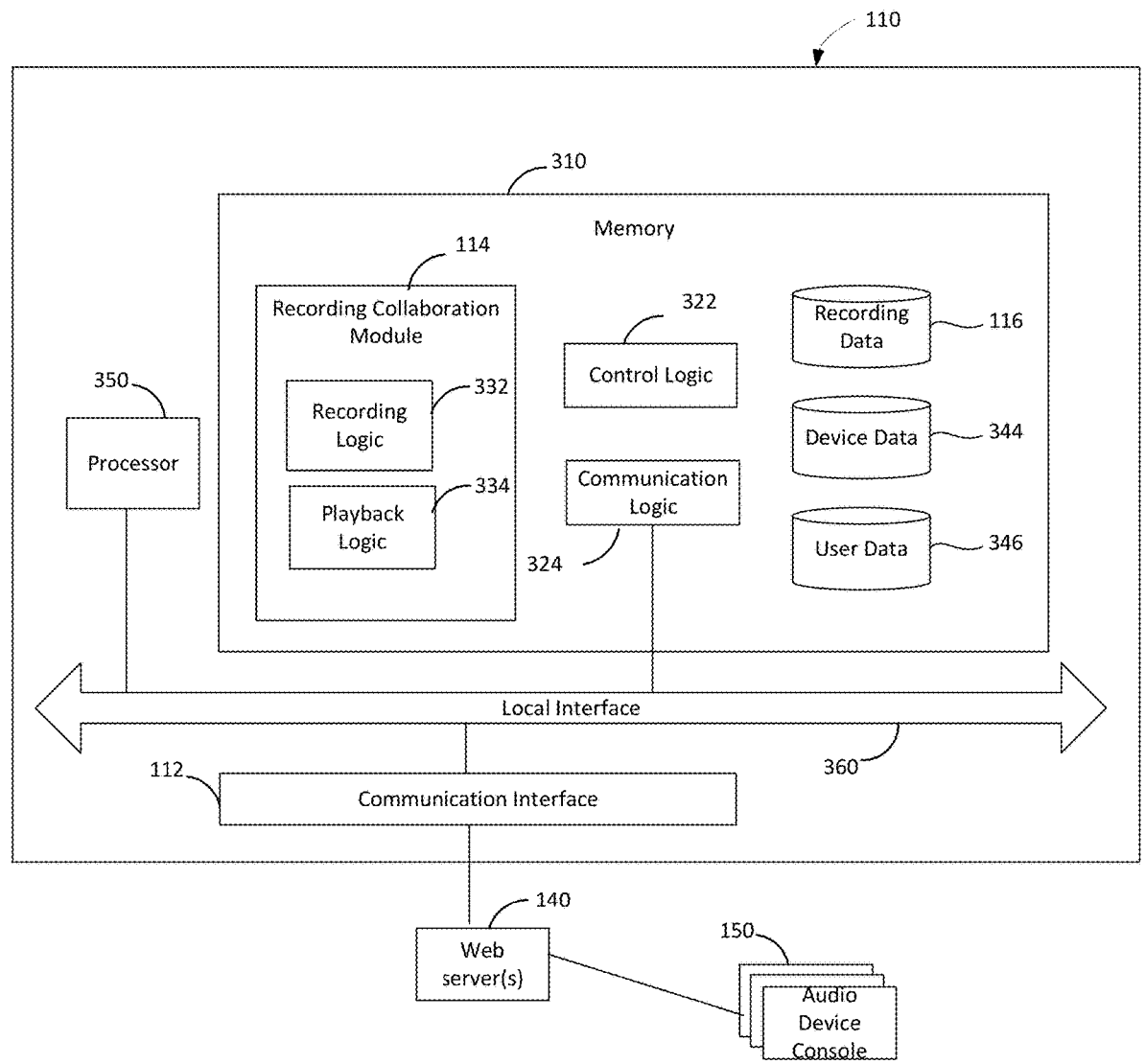
FIG. 3 depicts a block diagram of certain component parts of a collaborative recording system in accordance with some embodiments of the present disclosure.

FIG. 3 depicts an example schematic diagram of certain components of a collaborative recording system 110. FIG. 3 shows a diagrammatic representation of components of a machine such as a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions (sequential or otherwise) that specify actions to be taken by that machine. While only a single system 110 is illustrated, the term "machine" or "system" may also be taken to include any collection of machines or other computing devices that individually or jointly execute instructions to perform any one or more of the methodologies discussed herein.

The collaborative recording system 110 may include a memory 310. As used herein, memory 310 may refer to any suitable storage medium, either volatile and non-volatile (e.g., RAM, ROM, EPROM, EEPROM, SRAM, flash memory, disks or optical storage, magnetic storage, or any other tangible or non-transitory medium), that stores information that is accessible by a processor (e.g., processor 350). Memory 310 may also be understood as a machine-readable medium on which is stored instructions (e.g., software) embodying any one or more of the methodologies or functions described herein. While FIG. 3 illustrates a single discrete memory 310, it will be understood that the embodiments described herein are not limited to any particular arrangement and that other embodiments may store information in one combined memory, or with information stored in a different configuration in one or more memories, some local to the other components illustrated in FIG. 3 and/or some shared with, or geographically located near, other remote computing systems.

As illustrated, a number of logics are stored in memory 310 that may facilitate collaborative recording sessions, as well as the receipt, storage, and making available of recordings that multiple users can use to later create collaborative works. These depicted components may variously represent one or more algorithms, computational models, decision making rules or instructions, or the like implemented as software code or computer-executable instructions (i.e., routines, programs, objects, components, data structures, etc.) that, when executed by one or more processors 350, program the processor(s) to perform the particular functions of their respective logic. Although depicted in FIG. 3 as several discrete components, each labelled as an individual "module" or "logic", in various embodiments, the functions of each respective components 114, 322, and 324 may be executable on their own or as part of one or more other logics; that is, any configuration of the depicted logical components may be used, whether implemented by hardware, software, firmware, or any combination thereof. Further, the logics need not necessarily be part of collaborative recording system 110 and may instead by distributed over one or more computing systems, such as within web server 140. The capabilities of these various components are described in greater detail below.

The collaborative recording system 110 may include control logic 322, including one or more algorithms or models for generally controlling the operation of the collaborative recording system 110. The memory 310 may also, in some embodiments, include communication logic 324, including one or more algorithms or models for obtaining information from or communicating information via network 130 (FIG. 1). The collaborative recording system 110 may, via communication interface 112, operate to exchange data with various components, systems, and/or devices on the network 130 or any other network. For instance, communication interface 112 and communication logic 324 may be used (by, e.g., recording collaboration module 114) to access data from or send data to any of one or more audio device consoles 150, via one or more web servers 140. In some embodiments, communication logic 324 may use one or more application programming interfaces (APIs) provided by these entities to obtain their respectively stored data or transmit data or instructions to their systems. However, other methods of data collection/transmission may alternatively be used such as one or more software development kits, which may include, e.g., one or more web APIs, tools to communicate with embedded systems, or any other appropriate implementation In various embodiments, any of (or any subset of) collaborative recording system 110, web server 140, and/or audio device consoles 150 may be owned or managed by a single entity. In an exemplary embodiment, web server 140 can deliver, to audio device console 150, via the API 185, one or more of various user interferences generated by collaborative recording system 110, that provide a user with the ability to record, produce, and edit audio files, stream audio/video, and collaborate on any of the foregoing, or perform any other function allowed by a digital audio workstation, and/or any other relevant activities. In some embodiments, the data transmitted to the console 150 may be generated based on data stored in memory 310 as recording data 116 and/or device data 344. In some embodiments, the data transmitted to the console 150 may be further informed by or based on data obtained from devices 150, 160 and/or 170, data stored in any of one or more third party system databases 120, and/or data collected from one or more databases on system 110 or an external system.

While communication logic 324 is illustrated as a discrete logical component, in an alternative embodiment, the collaborative recording system 110 may include communication logic 324 as part of any of recording collaboration module 114 or control logic 322. In another alternative embodiment, the communication logic 324 may communicate with third-party systems and/or may coordinate with the control logic 322 to read or write data to memory 310 or to another data repository (not shown) within the collaborative recording system 110.

The logics of the exemplary collaborative recording system 110 depicted in FIG. 3 may be executed by one or more processors 350, which may include any of (or any combination of) a central processing unit (CPU), graphics processing unit (GPU), digital signal processor (DSP), application specific integrated circuits (ASICs), radio-frequency integrated circuits (RFICs), other specialized processor or combination of processors, or other circuitry that communicates to and drives the other elements within the collaborative recording system 110 via a local interface 360, which can include at least one communication bus. While FIG. 3 illustrates one processor 350 that implements all of the various logics and modules in the collaborative recording system 110, it is possible in other embodiments for the system 110 to employ multiple processors. In one such alternate embodiment, discrete processing elements may be used for each of (or any subset of) module 114 (including logics 332 and 334), control logic 322, and communication logic 324, or any portions or subsets of those logics. In some embodiments, the processing of system 110 is not limited to being performed by a processing element connected to the local interface 360, but instead, any portion of processing in support of the various logics may be distributed over one or more computer systems that may be remotely located.

Memory 310 may be configured, in some embodiments, to include various databases. While the term "database" or "repository" is used with reference to elements 116, 344, and 346, these components are not so limited nor is any particular form or configuration of data storage mandated, and the described "databases" may alternatively be one or more of an indexed table, a keyed mapping, or any other appropriate data structure, or any combination thereof.

Memory 310 may be configured, in some embodiments, to include a database storing recording data 116. Recording data 116 may include, for example, a recording ID uniquely identifying a recording project—that is, a track—and any stored audio/video samples or layers associated therewith. In some embodiments, recording data 116 may include, for each recording, historical information regarding creation, edit, deletion, users who have contributed to, accessed, and/or edited a recording, and the like. A recording project may be associated with one or multiple users, to allow multiple users to collaborate on a single project, whether asynchronously or in tandem. Recording data 116 includes, in the exemplary embodiment, recording data, which is audiovisual data captured by audio device console 150 or its peripherals, such data having been cast over network(s) 130 to web server 140 for storage. In some embodiments, recording data 116 may include, in association with each track, timestamp data showing the creation and/or modification of such data (as well as information identifying the user who created/modified). In some embodiments, recording data 116 may include copyright or ownership information, including, e.g., contact information for the owner(s) of the recording.

Device data 344 may include data obtained from or regarding an audio device console 150. For example, such data may include data regarding DAW software version/status, operating system, update status, device make/model, component/peripheral make/model, cookies, GPS or location data, I/O settings data, or other data customarily made available by a client device(s) and application(s).

In some embodiments, memory 310 may also store user data 346, including for instance, data with a user's profile. User data 346 may be associated with device data 344 and/or recording data 116, such that uniquely identified data in any of the databases (e.g., such as a unique recording ID, device ID, or user ID) may be used as a basis to look up other information in databases 116, 344, and 346. In some embodiments, a user may be associated with a console 150 on a 1:1 basis, and in others, for example those where multiple users share a single console 150, user profile data may be stored in separately from (though in association with) device data 344. Where a DAW is subscription based, a user may need to input authorization information (login/password, key, biometric data, or the like) to log in to the DAW they intend to use. New users may need to create an account and/or user profile for the DAW service of their choice, typically upon installation of any required software (though the particular times of registration may vary). In other embodiments, no registration or subscription is needed.

In an exemplary embodiment, system 110 may update information in databases 116, 344, and/or 346 based on data collected from web server 140. In the embodiment of FIG. 3, web server 140 is remote from system 110 and therefore such information is collected via communication logic 324. In other embodiments, web server 140 may be local to, or integral with, system 110 and such data may be accessed over local interface 360.

Recording collaboration module 114 may facilitate the sending and receiving of collective audio by each of multiple remotely-located users at their respective locations. That is, users authorized to use the system 110 and the production environment installed thereon can collaborate with other authorized users by uploading, in real-time, audio and/or video recordings being made via the audio device console 150. Recording logic 332 facilitates the collection of audiovisual content from consoles 150, for processing (if any) and storing as recording data 116. For example, where data has been sent by console 150 as multiple discrete transmissions (e.g., kick snare, hi hat and so on), recording logic 332 may store these transmissions separately (as recording data 116), but may also combine them into grouped and/or consolidated recordings.

Playback logic 334 facilitates access to stored recorded content to any of various remotely located users. Playback logic 334 may contain logic sufficient to limit access to recordings to authorized users, as appropriate. In an exemplary embodiment, the data associated with a particular recording may be limited to a particular authorized set of subscribed users, so as to prevent unauthorized dissemination and/or modification of the data. Accordingly, recording data 116 may store, in association with a record ID, one or more user IDs or device IDs corresponding to selected subscribed users to a DAW software. Each of these user/device IDs may be granted a respective level of permission (view/edit/modify/add/collaborate/share/favorite, and so on), so that access to any particular recording may be controlled to a fine level of granularity.

Transmission of Monitored Audiovisual Signals

Figure 4:
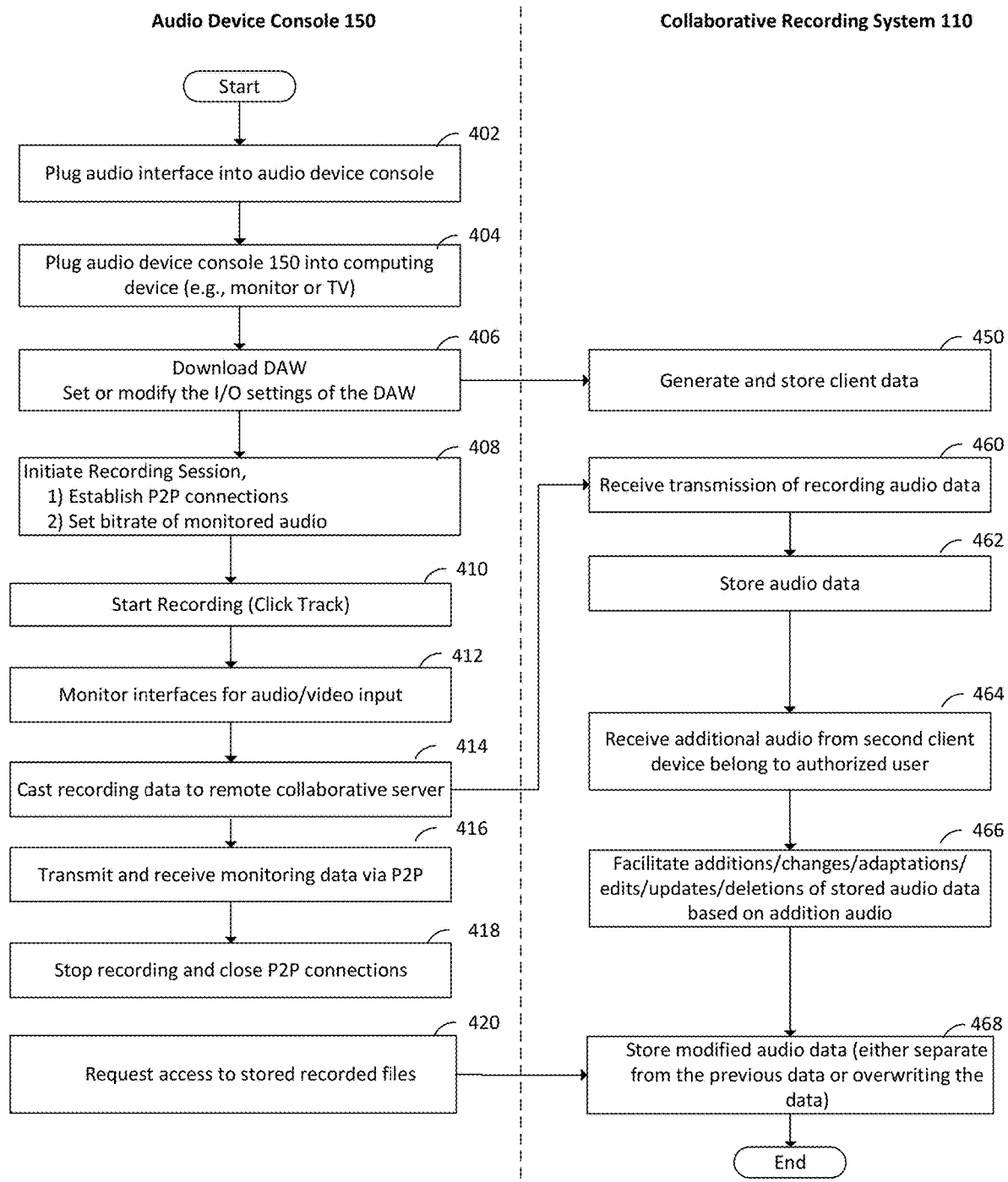
FIG. 4 is a flow chart of a collaborative recording process in accordance with some embodiments of the present disclosure.

FIG. 4 illustrates a flow chart of an exemplary process of configuring the audio device console 150, creating a collaborative recording with one or more remote users, and accessing stored recording content at the system 110. The process begins at step 402, at which a user's pre-existing audio interface 170 is plugged into audio device console 150. The audio device console 150 may then be plugged into any television or computer monitor (or other client-side computing system 160) via a standard, typically universal interface such as HDMI or USB-C (step 404). Once audio device console 150 is connected to the device 160 and the user's audio interface 170, the user may access the onboard software of the audio device console 150. This software will walk the user through the steps for setting up the device 150 and using an associated software and/or website. As part of this, the user may be instructed to download digital audio workstation software of their choice (step 406) and/or any necessary drivers. The process of downloading and storing the DAW may require registration of the user (and/or device) with the collaborative recording system 110, wherein the user sets up an account with various associated authorizations and settings. As part of step 406, the user, via one or more user interfaces, may also set or modify the input/output (I/O) settings of the DAW software to map each physical and virtual input to the console 150 to a virtual output. Once the I/O settings have been input, the various interfaces are configured to send signals to the web server 140 for recording by system 110.

In step 408, the user initiates a recording session. This may involve establishing direct peer-to-peer (P2P) connections with one or more collaborators. The number of P2P connections established corresponds to the number of respective pairs of users in the session that can be formed. In the case that the initiating user wishes to use low latency monitoring, the user's desired bitrate preferences are used to establish a base or common bit rate to be applied for P2P transmission during the session. The user may adjust bitrate settings for monitored audio at their own console 150 in order to optimize performance and accommodate the user's internet connection speed. The faster the connection, the higher the bitrate that may be set for the audio that is being monitored. In some embodiments, this setting may be a flag (low latency monitoring on/off), and in others, a particular determined or predetermined bitrate value may be set for the collection and recording of monitored audio at the audio device console 150. To the extent that any of the collaborator's I/O settings conflict with this bitrate, they will receive a prompt on their user interface to modify the settings to meet the common session bit rate.

In step 410, the initiating user begins recording for all collaborators in the session. Typically, this is lead off by a click track, count, or other signal. At step 412, and throughout the recording session, audio from each of the input interfaces of console 150 designated in step 406 is monitored. In some embodiments, the raw recording data may be stored at the console 150, however this step is not strictly required.

The recording data is cast in real time in step 414 from the console 150 to the system 110 via server 140, and stored in memory 310 for later access. This upload is performed as the data is being recorded, in real-time or near real-time to the initial capture of the audio (step 412), such that no significant or noticeable delay exists between when the audio is created and when it is recorded at the system 110. Accordingly, collaborators accessing the audio at system 110 can similarly access a recording in real-time, without visual or auditory discrepancy.

In step 416, the monitoring data (which includes the recording data) is transmitted via P2P to the other collaborators. The data sent from a single console 150 each of the peer collaborator devices is identical and redundant. The received P2P data is output over a local audio interface, such as speaker or headphones, so that the user can hear the recorded session. Where the bit rate of the monitoring data transmission has been adjusted, the monitoring data may be transmitted at a different rate than the raw data being cast to the server.

The recording may be stopped in step 418 at any time after the recording data was cast to the server, depending on the duration of the session. This includes stopping the casting of recording data and closing the outstanding P2P connections. The connection between the console 150 and the web server 140 is maintained in an active state so long as the console 150 is in use.

In step 460, the system 110 may receive a request (e.g., a handshake) to transmit audiovisual data, and the data is subsequently transmitted. Audio data may be stored in step 462 as recording data 116. Such data may include, for instance, audiovisual clips or tracks comprising a segment of sound or music. In step 464, the system 110 may receive requests to record audio from other collaborating users with various audio device consoles 150. These additional audio recordings (step 464) are recorded by the remote users while one or more of the initial audiovisual clips played back to the remote user (via console 150) in real time. Accordingly, the additional audio received in step 464 may be a recording of the stored audio data (462) including synchronization of a subsequently recorded audio track. In some embodiments, additional audiovisual data may be received that is synchronized to an audio recording, typically a collaborator or other user's contribution to, or derivation from, an existing recording. The originally-stored audio data (step 462) may be altered in step 466 in accordance with the data collected in step 464, so as to add/change/adapt/edit/update/delete, or otherwise modify the original recording, and that modified recording data may be stored at the system 110 in step 468. The modified recording may be generally understood to be a track made of layered audio recordings, representing a collaborative project between remote users. In an exemplary embodiment, the original recording data is not overwritten, and rather, the modified recording is stored as separate data in recording data 116, though association is maintained with the originally recorded data (e.g., versioning).

The users permitted to modify tracks in steps 464-466 are limited to those whose accounts with system 110 are authorized to both use the provided production environment and to collaborate with the initial user of audio device console 150 who submitted audio data (step 462), either on a user-level or a project level. While in an exemplary embodiment, the system 110 may be accessed through a web browser, embodiments may exist where the users who may access recordings at system 110 performs such access through their own console device 150. Similarly, in step 420, where the original user of console 150 requests access to stored recorded files, their level of authorization is verified by system 110 (through reference to device data 344 and/or user data 346) prior to providing such access. Through these means, users can record and share audio data in real-time, and may similarly collaborate in real-time by adding their layered or additional audio track data, without fear of unauthorized access or distribution. The system 110 may also allow for audio playback from the stored tracks resulting from the user collaboration.

In addition to the data stored on the system 110 (steps 462, 468), the user of console 150 may access raw audio files recorded to the console 150 as data 220. In some embodiments, this raw data may be additionally or alternately stored (or a backup may be stored) to an external storage device or to one or more non-volatile memory components at user device 160.

The systems and methods described herein provide a digital audio workstation (DAW) allowing a choice of DAW apps, network collaboration, and video conferencing capability. This may be implemented in a stand-alone unit, or as one or more software programs within a client-side computing device. Through such solutions, artists from remote locations around the world may create an online portfolio to showcase their work. The systems and methods described herein are not limited to the collection and sharing of audio data, and any type of data suitable for packeted transmission across one or more digital networks may be transferred in other embodiments, such as music, painting, sculpting, photography, videography, poetry, and so one. A collaborative environment is therefore provided where artists may reach out and work with each other online in different locations and working with different mediums, in turn being able to promote, and market their works on the website. In some embodiments, system 110 may include, or be communicatively coupled to one or more e-commerce systems or functionalities, such that a user may offer one or more of their recorded works for sale. Further still, recordings uploaded to system 110 are stored in association with a variety of information, including time stamp information to insure the protection of the artist's intellectual properties.

In conventional solutions, real-time collaboration in digital audio creation may be difficult or impossible due to network latency. Further, where users contributing to a single recording session may use different DAW software, inconsistency in functionality, interface, data type or format, and the like can complicate collaborative work. These difficulties may necessitate re-recordings and/or post-processing to synchronize or remove noise in audiovisual data, all of which can be computationally expensive and time-consuming tasks.

Unlike conventional solutions, in the systems and methods described herein, a hardware and/or software solution can be offered that functions as an input/output mechanism for audio content. More specifically, raw audio data can be taken in through a physical input interface, separated into multiple virtual inputs, and each of those inputs can be routed to a respective (or unique) virtual output interface. A set or subset of input raw data can therefore be streamed to a remote server such that the raw audio data is available at the server in real-time. At the same time, a different set or subset of input data (whether overlapping or not) can be directed to different virtual outputs, where such outputs may map to different networks than the remote server, via different communication protocols, and/or even back to a local or client-side device Further, in the systems and methods described herein, multiple users from multiple locations can record simultaneously from virtually anywhere in the world having a "decent" internet connection (one that meets console system requirements) without significant latency. This is done through the transmission of monitoring data (for collaborate purposes) wholly separate, and using a different protocol from, the actual session recording data. A low-latency solution is used for monitoring data, which need not be sent at full-resolution, but merely at a workable rate that allows all the collaborators to hear the same audio content simultaneously while recording regardless of any one user's available bandwidth. A user will be able to determine whether or not their connection speed is suitable for optimal performance, and all of the users in the session may synchronize their settings in the transmission of monitoring data. By these means, a user with a slower internet connection speed can set a standard that enforces synchronization of the transmission and receipt of the monitoring audio with other remote users.

With this bitrate management in place, the monitoring audio being sent and received by each user at their respective location can be of a different bitrate than the actual audio being recorded and cast to the server. That is, monitoring and bitrate optimization permits a user to record at one (fast) speed via HTTP while collaborating at a different speed via P2P. The "necessary" or "urgent" recording audio can be maintained in full-resolution and streamed in real-time for recording and storage. However, because full-resolution raw audio data is not being sent from person-to-person, the bandwidth taken up by the low-latency monitoring solution described herein is minimized.

Further, the system and methods described herein are agnostic of the particular DAW software used at any individual client site, allowing users with different software interfaces to collaborate together in a single environment. Accordingly, the system is highly robust and scalable across disparate computing systems.

What is more, because the system and methods described herein relate to a dedicated device (or dedicated logical area on a device), system security and standardization can be maintained. Because driver and version updates may be strongly managed, each user connected to the central server can be ensured to be on up to date. Any corruption, malicious intent, and/or security mismatch may be kept separate from the shared infrastructure, thereby maintaining the security, and integrity of the collaborative solution.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. An audio console comprising:
   a physical input for connecting the audio console to an audio interface;
   a memory; and
   one or more processing units configured to execute instructions stored in the memory to perform steps comprising:
   (a) establishing a virtual input configured to receive audio data from an input device;
   (b) establishing a first virtual output from the audio console to a remote server;
   (c) establishing a second virtual output from the audio console to a remote audio console;
   (d) capturing first audio data via the physical input, the first audio data being raw audio data;
   (e) transmitting the first audio data via the first virtual output to the remote server;
   (f) capturing second audio data via the virtual input; and
   (g) transmitting the second audio data via the second virtual output to the remote audio console at a transmission bitrate, the transmission bitrate being adjusted such that the second audio data is synchronized with corresponding second audio data captured by the remote audio console.

2. The audio console of claim 1, wherein the transmission of the first audio data to the remote server is performed in real-time in accordance with the capture of the first audio data.

3. The audio console of claim 1, wherein a network connection between the audio console and the remote audio console is a peer-to-peer connection.

4. The audio console of claim 1, wherein the one or more processing units is further configured to execute instructions stored in the memory to perform steps comprising:
   transmitting the first audio data via the second virtual output to the remote audio console.

5. The audio console of claim 1, wherein the input device is a webcam.

6. The audio console of claim 1, wherein the one or more processing units is further configured to execute instructions stored in the memory to perform steps comprising:
   obtaining, from the memory, a monitoring data transmission setting, the monitoring data transmission setting being associated with a stored bitrate value equal to the transmission bitrate,
   wherein the second audio data is transmitted via the second virtual output in accordance with the monitoring data transmission setting, and
   wherein the first audio data is transmitted via the first virtual output at a bitrate that is different than the stored bitrate value.

7. The audio console of claim 6, wherein the one or more processing units is further configured to execute instructions stored in the memory to perform steps comprising:
   transmitting, to the remote audio console, the stored bitrate value.

8. The audio console of claim 6, wherein the stored bitrate value is a predetermined value set by a user of the audio console via a user interface.

9. The audio console of claim 1, wherein the one or more processing units is further configured to execute instructions stored in the memory to perform steps comprising:
   (a) establishing a communication channel between the audio console and the remote server;
   (b) downloading to the audio console, via the communication channel, a digital audio workstation software; and
   (c) obtaining, from the remote server, based on the digital audio workstation software, one or more user interfaces for recording and playback of audiovisual data.

10. A method comprising:
    establishing, by an audio console, a virtual input configured to receive audio data from an input device;
    establishing, by the audio console, a first virtual output from the audio console to a remote server;
    establishing, by the audio console, a second virtual output from the audio console to a remote audio console;
    capturing, by the audio console, first audio data via a physical input of the audio console for connecting the audio console to an audio interface, the first audio data being raw audio data;
    transmitting, by the audio console, the first audio data via the first virtual output to the remote server;
    capturing, by the audio console, second audio data via the virtual input; and
    transmitting, by the audio console, the second audio data via the second virtual output to the remote audio console at a transmission bitrate, the transmission bitrate being adjusted such that the second audio data is synchronized with corresponding second audio data captured by the remote audio console.

11. The method of claim 10, wherein the transmission of the first audio data to the remote server is performed in real-time in accordance with the capture of the first audio data.

12. The method of claim 10, wherein a network connection between the audio console and the remote audio console is a peer-to-peer connection.

13. The method of claim 10, further comprising:
transmitting the first audio data via the second virtual output to the remote audio console.

14. The method of claim 10, wherein the input device is a webcam.

15. The method of claim 10, further comprising:
obtaining, by the audio console, a monitoring data transmission setting, the monitoring data transmission setting being associated with a stored bitrate value equal to the transmission bitrate,
wherein the second audio data is transmitted via the second virtual output in accordance with the monitoring data transmission setting, and
wherein the first audio data is transmitted via the first virtual output at a bitrate that is different than the stored bitrate value.

16. The method of claim 15, further comprising:
transmitting, to the remote audio console, the stored bitrate value.

17. The method of claim 15, wherein the stored bitrate value is a predetermined value set by a user of the audio console via a user interface.

18. The method of claim 10, further comprising:
establishing, by the audio console, a communication channel between the audio console and the remote server;
downloading, by the audio console, via the communication channel, a digital audio workstation software; and
obtaining, by the audio console from the remote server, based on the digital audio workstation software, one or more user interfaces for recording and playback of audiovisual data.

* * * * *